United States Patent
Park et al.

(10) Patent No.: US 8,981,937 B2
(45) Date of Patent: Mar. 17, 2015

(54) RFID TAG

(75) Inventors: Ji Man Park, Daejeon (KR); Lee Mi Do, Daejeon (KR); Kyu Ha Baek, Daejeon (KR); Kun Sik Park, Daejeon (KR); Dong Pyo Kim, Daejeon (KR); Jong Chang Woo, Gyeonggi-do (KR); Zin Sig Kim, Daejeon (KR); Joo Yeon Kim, Daejeon (KR); Ye Sul Jeong, Gyeongsangbuk-do (KR); Yong Hyun Ham, Gyeongi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 693 days.

(21) Appl. No.: 13/294,359

(22) Filed: Nov. 11, 2011

(65) Prior Publication Data
US 2012/0161941 A1    Jun. 28, 2012

(30) Foreign Application Priority Data
Dec. 28, 2010   (KR) .................... 10-2010-0136352

(51) Int. Cl.
  *G08B 13/14*  (2006.01)
  *G06K 19/073*  (2006.01)
(52) U.S. Cl.
  CPC .............. *G06K 19/07345* (2013.01)

USPC .............. 340/572.1; 340/539.1; 340/572.3; 340/572.7; 340/10.34; 340/10.51

(58) Field of Classification Search
None
See application file for complete search history.

(56) References Cited

U.S. PATENT DOCUMENTS

| | | | |
|---|---|---|---|
| 2005/0237953 A1* | 10/2005 | Carrender et al. | 370/278 |
| 2006/0145853 A1* | 7/2006 | Richards et al. | 340/572.1 |
| 2006/0244592 A1* | 11/2006 | Kansala et al. | 340/571 |
| 2007/0109101 A1 | 5/2007 | Colby | |
| 2007/0200684 A1* | 8/2007 | Colby | 340/10.51 |
| 2010/0109873 A1 | 5/2010 | DeRose et al. | |
| 2010/0123583 A1* | 5/2010 | Bommer et al. | 340/572.7 |

FOREIGN PATENT DOCUMENTS

KR   1020080042578   5/2008
KR   1020100042752   4/2010

* cited by examiner

*Primary Examiner* — Curtis King
(74) *Attorney, Agent, or Firm* — Nelson Mullins Riley & Scarborough LLP; Anthony A. Laurentano, Esq.; Dipti Rammarain, Esq.

(57) ABSTRACT

An RFID tag includes: an antenna receiving an RF signal from a reader; an AFE (analog front end) generating voltage using the RF signal; and one or more switches interposed between the antenna and the AFE and controlling the connection between the antenna and the AFE through the switch operation.

15 Claims, 10 Drawing Sheets

RFID TAG

CROSS-REFERENCE TO RELATED APPLICATIONS

This application is based on and claims priority from Korean Patent Application No. 10-2010-0136352, filed on Dec. 28, 2010, with the Korean Intellectual Property Office, the disclosure of which is incorporated herein in its entirety by reference.

BACKGROUND OF THE INVENTION

1. Field of the invention

The present invention relates to an RFID tag, and more particularly to an RFID tag capable of improving the recognition rate of the RFID and capable of recognizing a location of a certain RFID tag among a plurality of the RFID tags.

2. Description of the Prior Art

As generally known in the art, an RFID (radio frequency identification) system is the technology that can recognize an object using the radio communication, wherein a small semiconductor chip and an antenna connected to the small semiconductor chip are used to process the information of the object. Different from a barcode system recognizing only one object at a time, the RFID system has the advantage in that a number of the objects are recognized from a remote distance. The RFID system is currently used in a variety of field, such as a warehouse for storing products, the management of a special medicine, a supply network for military items, the management of the articles in a large-size market, and a traffic card. It is expected that the RFID system will be adopted in a multi-function electronic pay system for supplementing a function of a credit card in the future.

The RFID system includes: an RFID tag with a chip storing a variety of information and an antenna connected with the chip; and a reader supplying the current to the RFID tag and reading the information stored in the chip.

A passive type RFID tag does not have its own power source inside thereof, and thus the reader has to supply the power to the RFID tag using a continuous wave (CW). After receiving the power supply, the RFID tag modulates the continuous wave sent by the reader in the ASK (amplitude shift keying)/PSK (phase shift keying) manner and then transfers the modulated signal to the reader by backward-scattering. Accordingly, anybody can obtain the information stored in the RFID tag if the passive type RFID tag is supplied with the sufficient power.

In the meantime, when the RFID tag approaches the reader, the RFID tag performs the radio communication in response to the reader's request. Here, if a number of the RFID tags are within a range enabling the reader to perform the recognition, all of the RFID tags can be recognized instantly. However, the recognition rate, which is defined by the percentage of the RFID tags that can be recognized by the reader, cannot reach 100%, and a location of the recognized passive type RFID tag cannot be determined due to the interference between the RFID tags and the physical stacking of the RFID tags.

SUMMARY OF THE INVENTION

Accordingly, the present invention has been made to solve the above-mentioned problems occurring in the prior art, and an object of the present invention is to provide an RFID tag capable of improving the recognition rate of the RFID tag and of recognizing a location of a certain RFID tag among a plurality of the RFID tags.

In order to accomplish this object, there is provided an RFID tag including: an antenna receiving an RF signal from a reader; an AFE (analog front end) generating voltage using the RF signal; and one or more switches interposed between the antenna and the AFE and controlling the connection between the antenna and the AFE through a switching operation.

In the present invention, it is possible to improve the recognition rate of the RFID tag by providing the RFID tag with a physical switch and a rechargeable battery.

In addition, it is possible to recognize a location of a certain RFID tag among a plurality of the RFID tags by providing the RFID tag further including an indicator indicating a state of the RFID tag.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description and drawings, the same reference numerals are used to designate the same or similar components, and so repetition of the description on the same or similar components will be omitted.

The present invention is characterized in that a physical hardware device is added to a conventional RFID tag in order to improve the recognition rate of a passive type RFID tag and to recognize a location of the RFID tag.

In general, the RFID tag includes an antenna, an Analog Front End (AFE), a control module and a memory. In the present invention, however, a hardware device for performing a switch operation of the RFID tag is added to thereby realize a higher recognition rate.

Figure 1A:
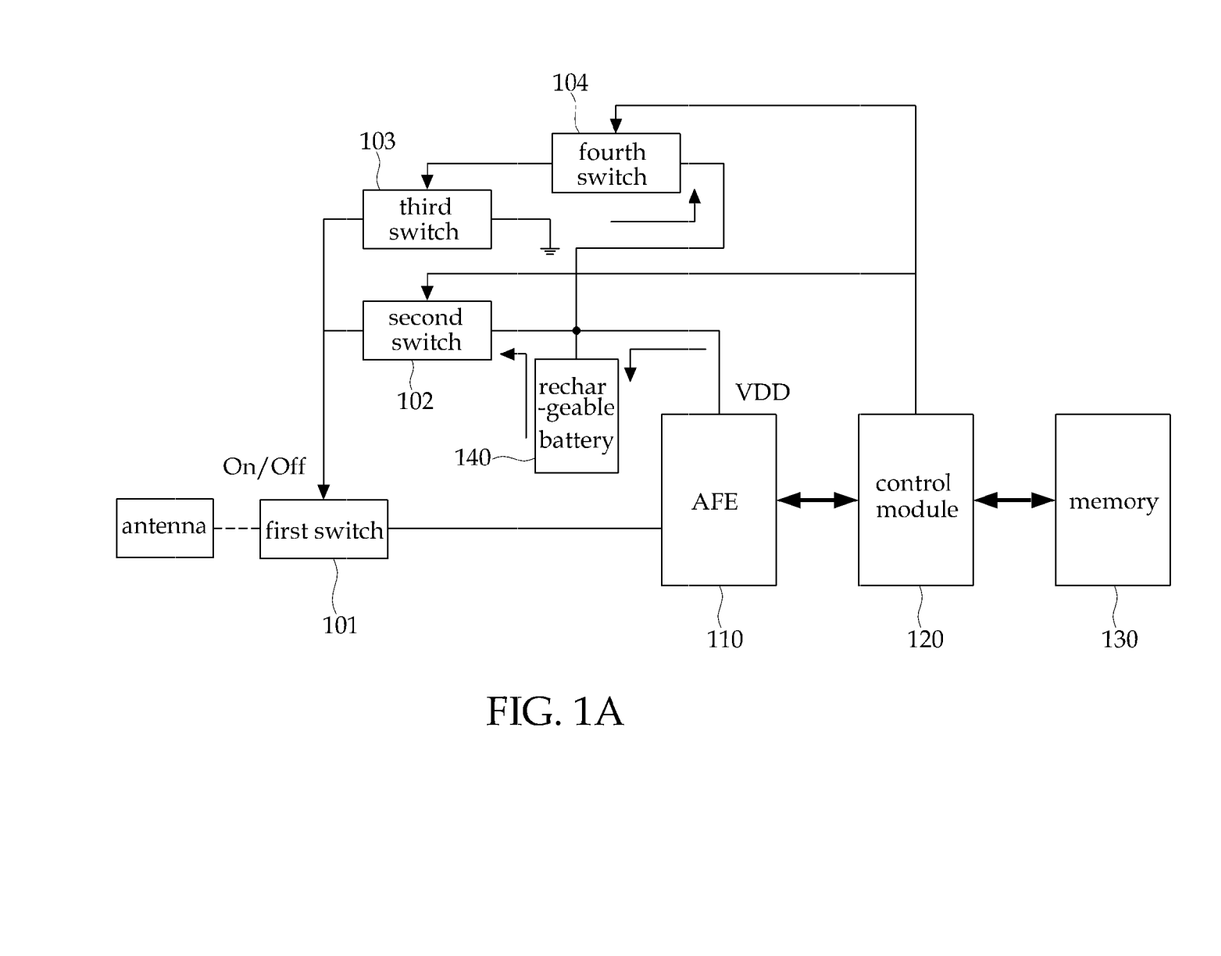
FIG. 1A and FIG. 1B are block diagrams, each of which schematically illustrates a structure of an RFID tag in accordance with a first embodiment of the present invention.
Figure 1B:
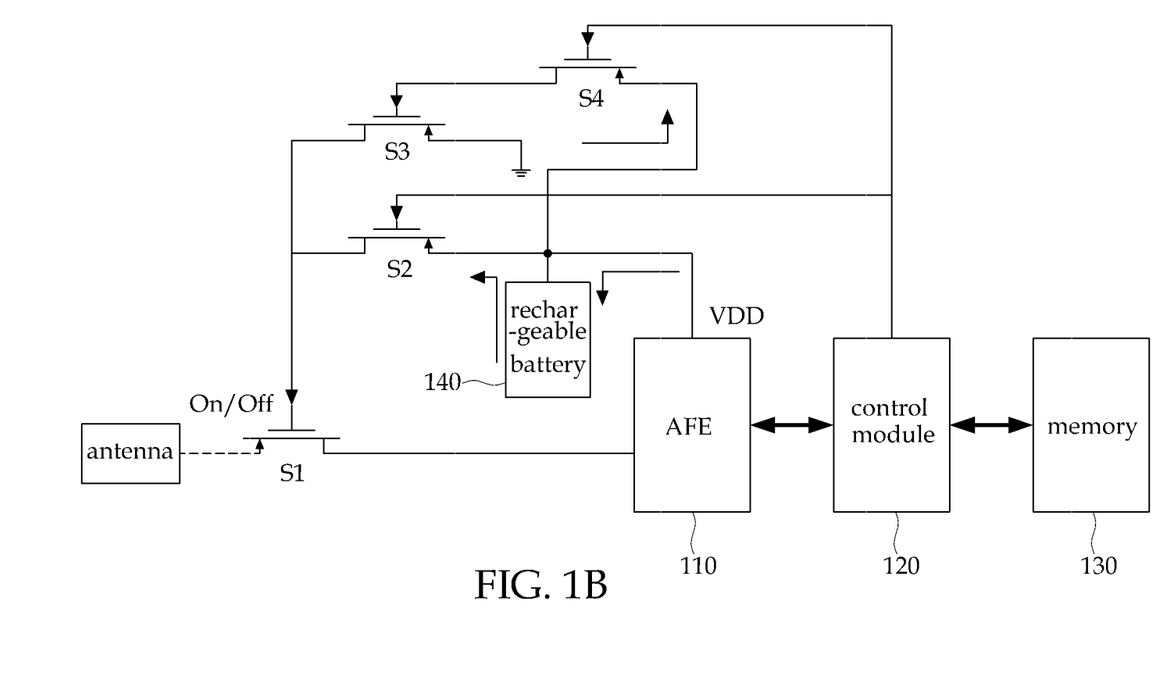

FIG. 1A and FIG. 1B illustrate block diagrams, each of which schematically illustrates a structure of a RFID tag in accordance with a first embodiment of the present invention.

When the RFID tag and a reader approach each other for performing the radio communication there-between, the RFID operates according to the reader's request. Here, if a number of the RFID tags are located within a communication range of the reader, the reader may recognize the RFID tags instantly. In reality, however, it is difficult to recognize 100% of the RFID tags due to the interference between the RFID tags and the physical stacking of the RFID tags, In other words, a majority of the RFID tags may send a response message in response to the reader's request, but a minority of the RFID tags may not operate as desired due to many kinds of the physical phenomena.

In the present invention, a switch is arranged between the antenna and the AFE, so that the RFID tag may turn the switch off in response to the reader's request to thereby remove a signal entered into the RFID tag through the antenna, so that the interference phenomenon between the RFID tags can be avoided.

Referring to FIG. 1A, when the reader approaches the RFID tag, a first switch 101 and a third switch 103 are turned on, whereas a second switch 102 and a fourth switch 104 are turned off. Accordingly, a rechargeable battery 140 is charged by a voltage supplied from the AFE 110.

When the normal communication between the RFID tag and the reader is completed, the second switch 102 and the fourth switch 104 are turned on, whereas the first switch 101 and the third switch 103 are turned off. Here, the voltage charged in the rechargeable battery 140 flows through the second switch 102 and the fourth switch 104 and then control the first switch 101 and the third switch 103.

The above-mentioned switch control is controlled by a control signal from the control module 120, wherein the RFID tag itself may sense the radio communication signal to thereby turn on/off the second switch 102 and the fourth switch 104 or the second switch 102 and the fourth switch 104 may be turned on/off according to the reader's request signal when the RFID tag and the reader perform the radio communication there-between.

If the RFID tag controls the switch operation of the second switch 102 and the fourth switch 104, the control module 120 senses the completion of the radio communication with the reader and then turns the second switch 102 and the fourth switch 104 on. Thereby, the first switch 101 and the third switch 103 may be turned off. If the second switch 102 and the fourth switch 104 are controlled in response to the reader's request, the RFID tag, the recognition of which was completed, receives predetermined flag information included in the signal sent from the reader or receives from the reader a data tag commanding the first switch 101 and the third switch 103 to turn off, to thereby enable controlling the switch.

Accordingly, the RFID tag, the recognition of which was completed by finishing the communication with the reader, short-circuits the antenna by means of the switch operation for a predetermined time, so that it is possible to precisely recognize the minority of the RFID tags that could not be recognized due to the interference between the RFID tags and the physical phenomenon.

Referring to FIG. 1B, switch devices S1, S2, S3 and S4 are the analog switches, wherein a transistor like CMOS or BJT may be used as the switch device. Particularly, it is preferable to use PMOS device (P-type Metal Oxide Semiconductor device) as the first switch 101.

If the PMOS device is used as the first switch 101, a gate terminal of the first switch 101 indicates 0V at an initial state and it is possible to perform the radio communication when the reader approaches the RFID tag, because the antenna is in a connected state. Here, the rechargeable battery 140 is charged by the voltage supplied from the AFE 110. Then, after completing the normal communication between the RFID tag and the reader, the second switch 102 is converted from the off-state to the on-state by means of the reader's request or the RFID tag's own sensing function and the current flows from the rechargeable battery 140 to a gate terminal of the first switch 101 through the second switch 102.

In other words, the first switch 101 turns off because the voltage VDD of the rechargeable battery 140 is inputted to a gate terminal of the PMOS device, i.e., the first switch 101. In the off-state, the radio communication with the reader is not available because the connection to the antenna cuts off. On the other hand, the rechargeable battery 140 provides the gate terminal of the PMOS device, i.e. the first switch 101 with the VDD voltage for a predetermined period, and then the voltage of the rechargeable battery 140 is gradually discharged to make the VDD to reach 0V.

Figure 2A:
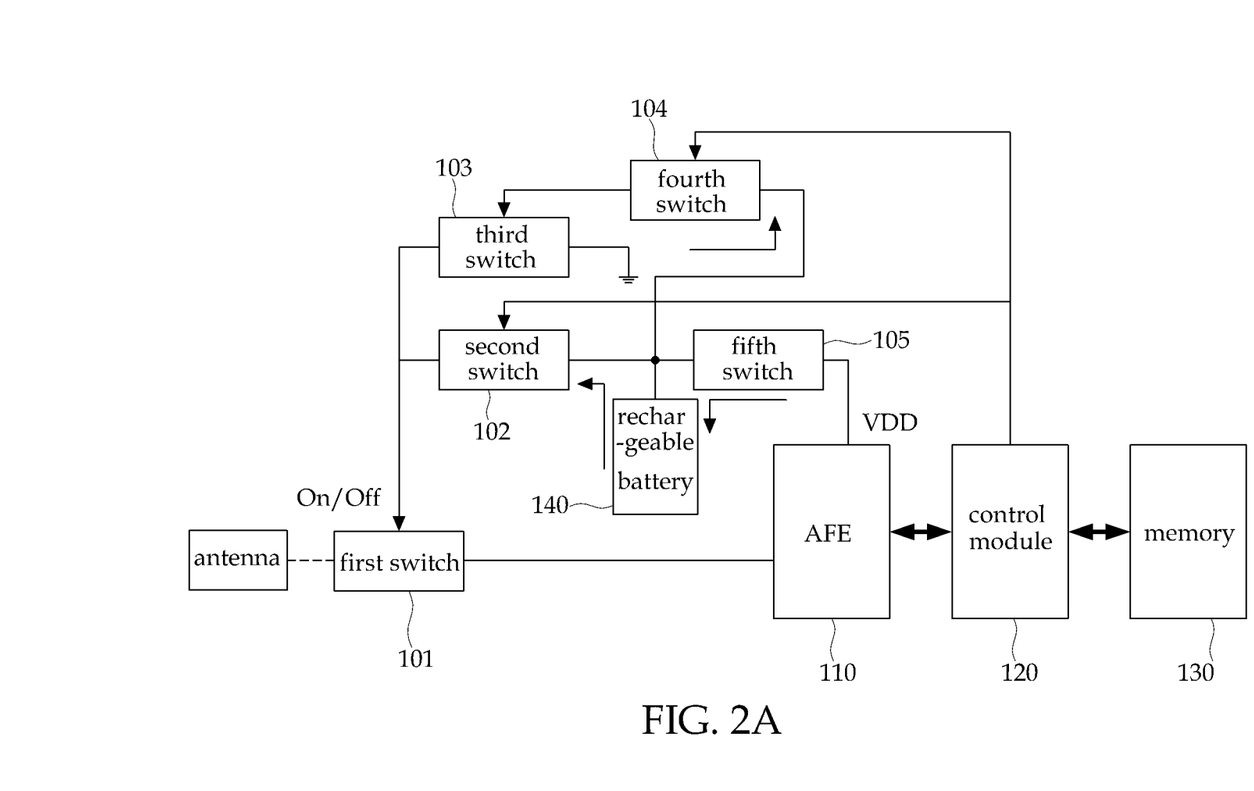
FIG. 2A and FIG. 2B are block diagrams, each of which schematically illustrates a structure of an RFID tag in accordance with a second embodiment of the present invention.
Figure 2B:
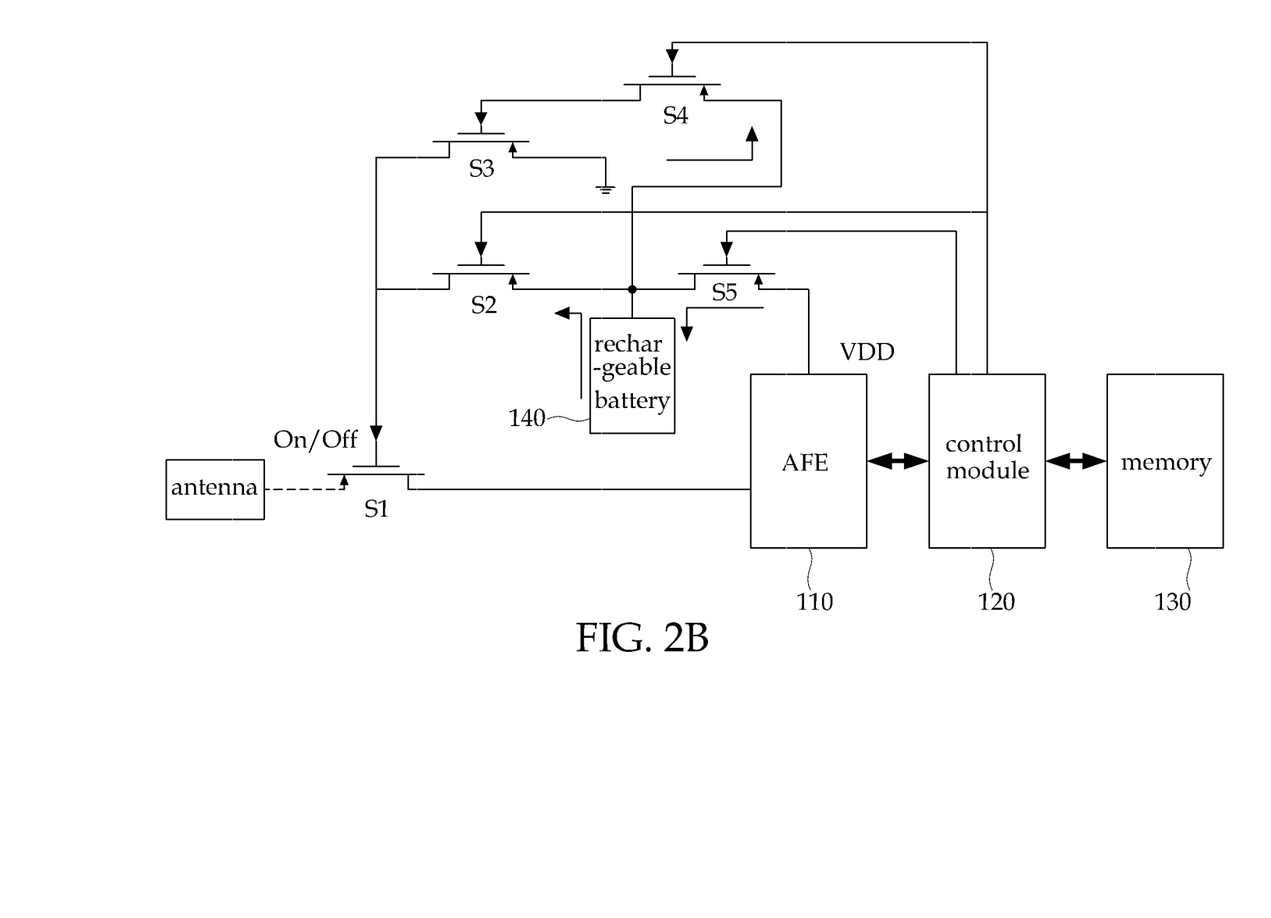

FIG. 2A and FIG. 2B are block diagrams, each of which illustrates a structure of an RFID tag in accordance with a second embodiment of the present invention.

Referring to FIG. 2A and FIG. 2B, the RFID tag according to the second embodiment of the present invention operates similarly to the RFID tag according to the first embodiment. Specifically, when the reader approaches the RFID tag, the first switch 101, the third switch 103 and the fifth switch 105 turn on, whereas the second switch 102 and the fourth switch 104 turn off. Accordingly, the rechargeable battery 140 is charged with a constant voltage.

Thereafter, when the normal communication is completed between the RFID tag and the reader, the second switch 102 and the fourth switch 104 turn on, whereas the first switch 101, the third switch 103 and the fifth switch 105 turn off. The voltage charged in the rechargeable battery 140 flows through the second switch 102 and the fourth switch 104 and controls the first switch 101, the third switch 103 and the fifth switch 105.

Accordingly, the first switch 101 of the RFID tag turns off to thereby short-circuit the antenna for a predetermined period, so that it is possible to remove the interference phenomenon between the RFID tags and to precisely recognize even the minority of the RFID tags.

In FIG. 2A and FIG. 2B, the fifth switch 105 controls the discharge rate of the rechargeable battery 140 to thereby make the relatively slow discharge rate, because the RFID tag may restart its operation to cause the interference if the rechargeable battery 140 discharges too fast.

Figure 3:
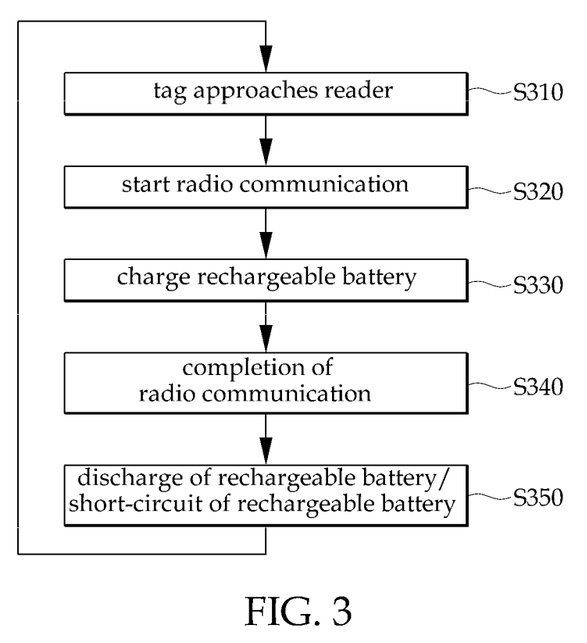
FIG. 3 is a flow chart sequentially illustrating an operation of the RFID tag in accordance with the present invention.

FIG. 3 is a flow chart sequentially illustrating the operation of the RFID of the present invention.

When the RFID tag physically approaches the reader (S310), the RFID tag sends the response message to the reader in response to the reader's request to thereby initiate the radio communication between the reader and the RFID tag (S320).

Here, the first switch 101, i.e., the PMOS device always is maintained in a connected state while it is in a natural state in which the RFID is attached to an ordinary object or a human being without any communication with the reader. In other words, it means that the first switch 101 is always maintained in the on-state while it is in the natural state as illustrated in FIG. 1A and FIG. 2A. Also, the voltage level of the rechargeable battery 140 is 0V in the natural state. Because the RFID tag does not have any power source in the natural state, the control mode of the first switch 101 has '0'. Here, when the control mode of the first switch 101 has '0', the PMOS device is used as a representative device that maintains the first switch 101 in the connected state. The PMOS device stays in a conducting state wherein the current flows between a source S and a drain D when the gate has '0'. To the contrary, the PMOS device stays in an interrupted state when the gate G has 'VDD'.

Thereafter, when the radio communication begins, the AFE 110 provides the rechargeable battery 140 with the power, to thereby make the rechargeable battery charged (S330).

When the radio communication between the reader and the RFID tag completes normally (S340), the control module 120 controls the second switch 102 to switch from the off-state to the on-state, and the rechargeable battery 140 discharges the charged voltage, so that the first switch 101 turns off (S350).

When the discharge of the rechargeable battery 140 is completed, the gate voltage of the first switch 101 turns back to 0V to thereby convert the first switch 101 to the on-state. Accordingly, the radio communication becomes available again when the RFID tag approaches the reader.

On the other hand, the RFID tag that includes a switch for the purpose of switching on/off the antenna connection is capable of switching on/off the antenna even when the rechargeable battery is removed. Also, it is possible to improve the recognition rate. Here, the RFID tag makes use of the VDD power source supplied from the AFE in order to turn the switch off. Accordingly, an off-period of the antenna connection is shorter in the RFID tag without a separate rechargeable battery than in the RFID tag with the rechargeable battery.

Figure 4:
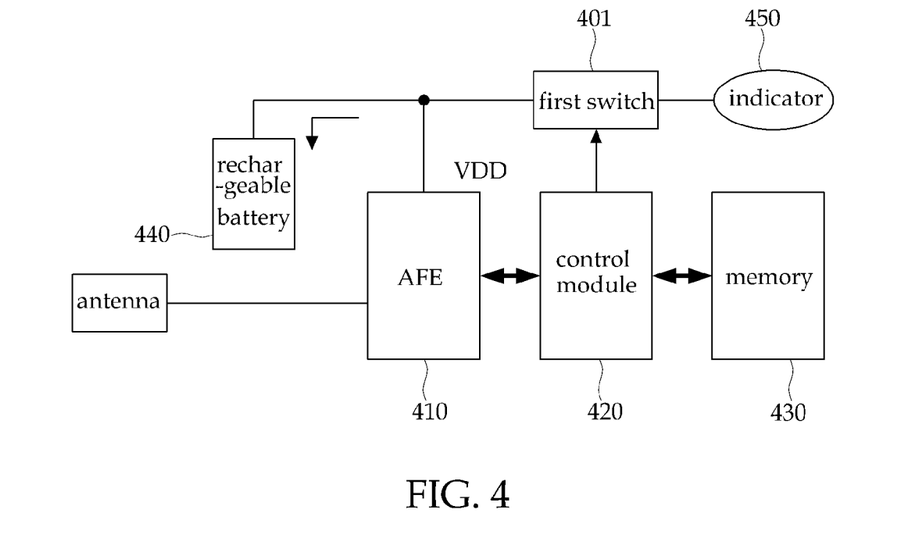
FIG. 4 is a block diagram schematically illustrating a structure of an RFID tag in accordance with a third embodiment of the present invention.

FIG. 4 is a block diagram of the structure of a RFID tag in accordance with a third embodiment of the present invention.

Generally, it is uneasy to recognize the location of the RFID tag by means of only one reader. In particular, it is uneasy for a user to find out a desired RFID tag if there are a hundreds of the RFID tags. Thus, the embodiment of the present invention intends to realize the recognition of the location by adding a separate indicator 450 to the RFID tag.

First of all, when the reader and the RFID tag approach to each other for performing the radio communication, the RFID tag operates according to the reader's request. The RFID tag is used for identifying and searching for an object (a human being) because it is attached to the object, but it is uneasy to search for a desired RFID tag or a malfunctioning RFID tag if the reader operates at the location where a number of the RFID tags are presents.

The RFID tag responding to the reader's request charges a rechargeable battery 440 with the output voltage VDD of an AFE 410. The voltage in the rechargeable battery 440 causes the indicator 450 to operate through a first switch 401.

Specifically, when the reader and the RFID tag approach each other, the first switch 401 turns off by means of the control signal from the control module 420 and the rechargeable battery 440 is charged with a constant voltage. When the normal communication between the RFID tag and the reader is completed, a control module 420 controls the first switch 401 to turn on, to thereby operate the indicator 450 using the voltage of the rechargeable battery 440.

Here, the control of the first switch 401 in the control module 420 may be performed in such a way that the first switch turns on/off according to the reader's request or the first switch 401 is controlled according to whether an ID stored in the RFID tag is coincident with an ID of the RFID or according to a tag indicator that is required by the reader.

According to the circumstances, the process can be performed in the RFID tag itself wherein the first switch 401 may include the PMOS device and wherein the first switch 401 may turn on to thereby operate the indicator 450 when the power supply from the reader is interrupted.

The rechargeable battery 440 is charged with the voltage while the radio communication with the reader is performed, whereas a substitute power source may be used when the RF power supply from the reader is unavailable. Any sensible means, such as an electronic paper (e-paper), an LED, a speaker etc., may be used as the indicator 450.

Figure 5:
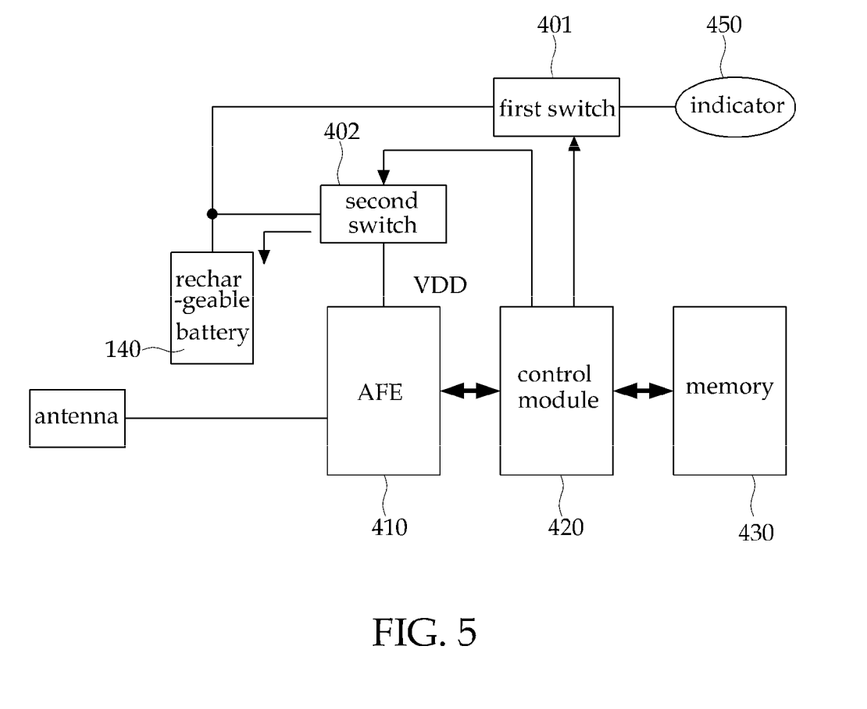
FIG. 5 is a block diagram schematically illustrating a structure of an RFID tag in accordance with a fourth embodiment of the present invention.

FIG. 5 is a block diagram schematically illustrating the structure of the RFID tag according to a fourth embodiment of the present invention.

Referring to FIG. 5, when the reader and the RFID tag approach to each other, the first switch 401 turns off; a second switch 402 turns on; and the rechargeable battery 440 is charged with a constant voltage. Thereafter, the normal communication between the RFID tag and the reader is completed, the first switch 401 turns on; the second switch 402 turns off; and the voltage in the rechargeable battery 440 operates the indicator 450.

Figure 6:
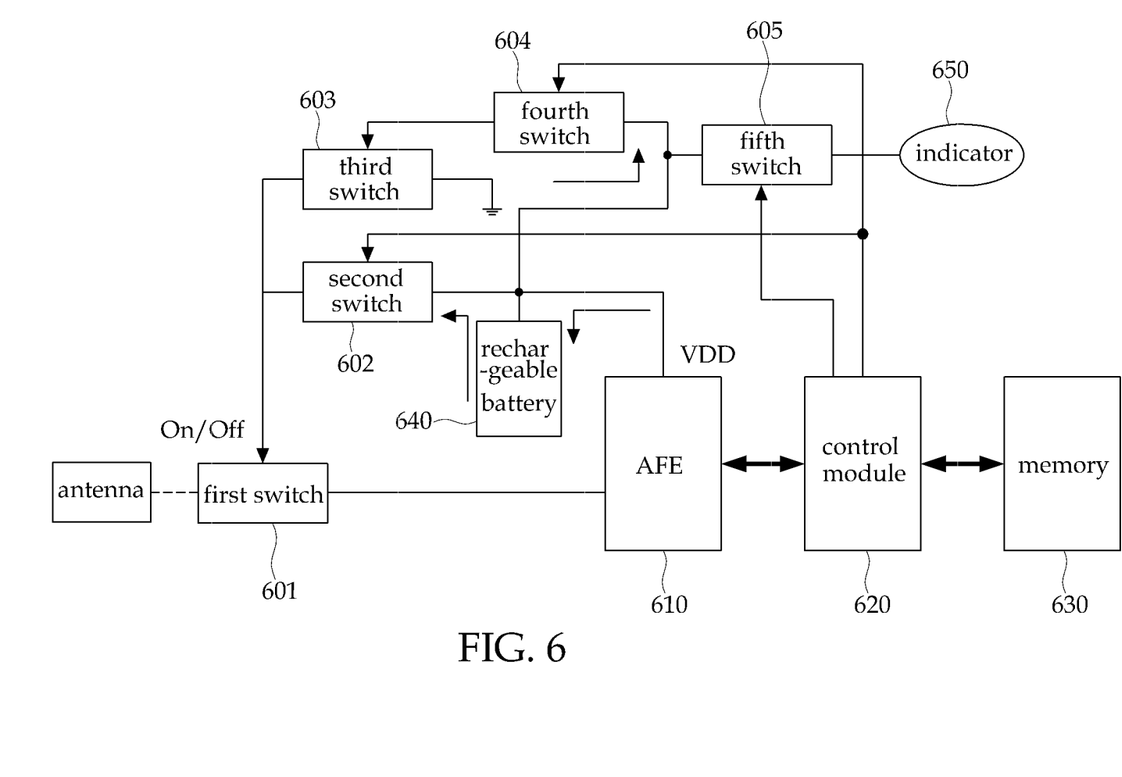
FIG. 6 is a block diagram schematically illustrating a structure of an RFID tag in accordance with a fifth embodiment of the present invention.

FIG. 6 is a block diagram schematically illustrating the structure of an RFID tag according to a fifth embodiment of the present invention.

When the reader and the RFID tag approach to each other, a first switch 601 and a third switch 603 turn on, whereas a second switch 602 and a fourth switch 604 are turned off by the control module 620. Also, a rechargeable battery 640 is charged with a constant voltage. When the normal communication between the RFID tag and the reader is completed, by means of the control module 620, the first switch 601 and the third switch 603 are turned off, whereas the second switch 602 and the fourth switch 604 are turned on. The voltage charged in the rechargeable battery 640 operates the indicator 650 through a fifth switch 605.

The RFID tag described with reference to FIG. 6 is characterized in that a hardware device is added in order to attain a higher recognition rate and the recognition of the location. Specifically, when the reader and the RFID tag approach to each other for performing the radio communication, the RFID tag operates according to the reader's request. Here, although the reader can instantly recognize hundreds of the RFID tags, it is difficult to recognize 100% of the RFID tags due to the interference between the tags or to the physical stacking of the tags. In other words, a majority of the RFID tags can send the response message in response to the reader's request, whereas a minority of the RFID tags may not work normally. Here, the RFID tag that has reacted to the reader's request turns off the first switch 601 between the antenna and the AFE 610 to thereby cut off a signal from the antenna, and thus it is possible to remove the interference phenomenon. Accordingly, the reader can recognize the minority of the RFID tag, which was not normally recognized due to the interference phenomenon.

Also, when the normal communication between the RFID tag and the reader is completed at the same time as the above-described operation, the fifth switch 605 turns on to thereby enable the operation of the indicator 650 using the voltage stored in the rechargeable battery 640.

Figure 7:
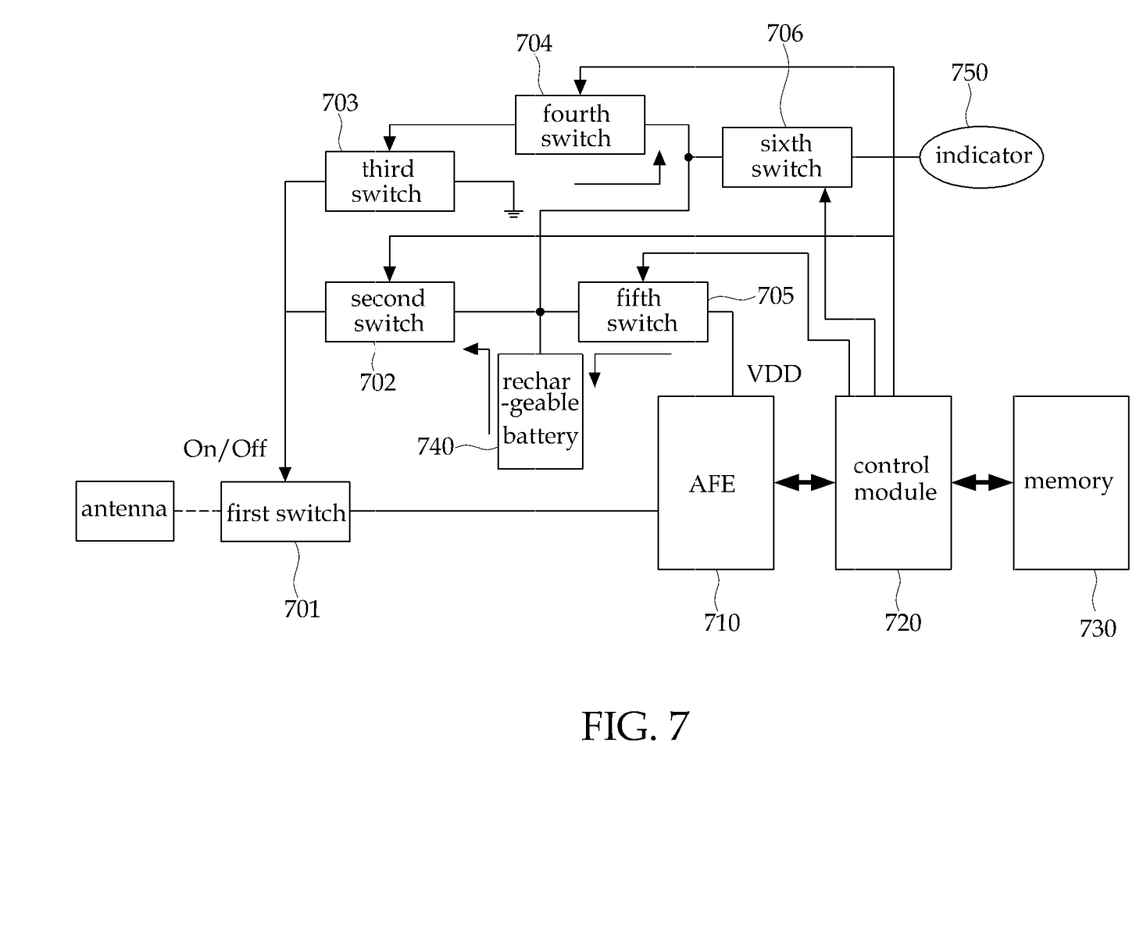
FIG. 7 is a block diagram schematically illustrating a structure of an RFID tag in accordance with a sixth embodiment of the present invention.

FIG. 7 is a block diagram schematically illustrating the structure of an RFID tag according to a sixth embodiment of the present invention.

Referring to FIG. 7, when the reader and the RFID tag approach to each other, a first switch 701, a third switch 703 and a fifth switch 705 turn on; a second switch 702, a fourth switch 704 and a sixth switch 706 turn off; and a rechargeable battery 740 is charged with a constant voltage supplied from an AFE 710.

Thereafter, when the normal communication between the RFID tag and the reader is completed, the second switch 702, the fourth switch 704 and the sixth switch 706 turn on; the first switch 701, the third switch 703 and the fifth switch 705 turn off; and the voltage charged in the rechargeable battery 740 flows through the second switch 702 and then controls the first switch 701. Accordingly, the RFID tag short-circuits the antenna for a while, so that the interference phenomenon between the RFID tags may be removed and the reader may precisely recognize the minority of the RFID tags.

Also, when the normal communication between the RFID tag and the reader is completed at the same time as the above-described operation, the sixth switch 706 turns on to thereby operate the indicator 750 using the voltage stored in the rechargeable battery 740.

Figure 8:
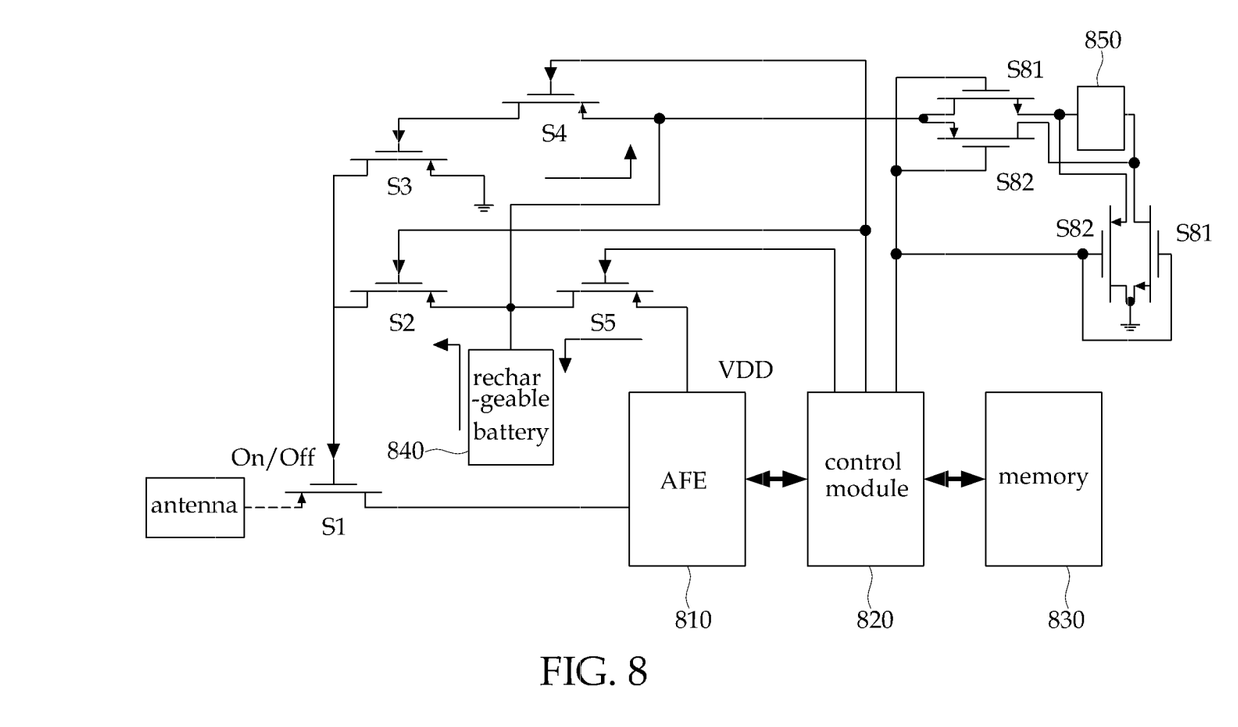
FIG. 8 is a block diagram schematically illustrating a structure of an RFID tag in accordance with a seventh embodiment of the present invention.

FIG. 8 is a block diagram schematically illustrating the structure of an RFID tag according to a seventh embodiment of the present invention.

The operation of the RFID tag illustrated in FIG. 8 is the same as that of the RFID tag illustrated in FIG. 7, but the embodiment illustrated in FIG. 8 adopts an electronic paper 850, instead of the indicator 750 illustrated in FIG. 7.

Also, the sixth switch 706 illustrated in FIG. 7 is represented as four switches S81 and S82 illustrated in FIG. 8. Specifically, the operation of the switches S81 and S82 are controlled by a control module 820. When the control module 820 is in a high state, the switch S81 turns on, whereas the switch S82 turns off. To the contrary, when the control module 820 is in a low state, the switch S81 turns off, whereas the switch S82 turns on.

As such, the on/off operation of the four switches S81 and S82 causes the electronic paper 850 to display color die to the charge transfer. Accordingly, with the discernment of this color, it enables the user's naked eye to determine whether or not the RFID is in a state of a malfunction or whether or not the reader normally reads the RFID tag.

As described herein before, the RFID tag can be embodied as a one-piece chip excluding the indicators 750 and 850; otherwise, the RFID tag can be embodied as a one-piece chip excluding the batteries 740 and 840 and the indicators 750 and 850. Also, the rechargeable batteries 750 and 850, each of which is a capacitor, can be charged instantly and can be embodied as film capacitors.

The above described RFID tag including the indicator can recognize the location of the RFID tag by means of the human being's sense even when the rechargeable battery is removed. The location recognition of the RFID tag is dependent on a characteristic of the indicator. However, because the indicator like the electronic paper operates using the voltage, the electronic paper may react to thereby display a certain sign (e.g., the number, O/X sign, a certain symbol and a certain color) when the VDD voltage is once applied to the electronic paper.

Accordingly, in the RFID tag which has the switch for connecting the antenna or the switch for connecting the indicator may control the switch to make the antenna connected or to indicate an operation state of the RFID tag even if it does not have the separate rechargeable battery.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An RFID tag comprising:
   an antenna for receiving an RF signal from a reader;
   an AFE (analog front end) for generating voltage using the RF signal;
   one or more switches interposed between the antenna and AFE and controlling connection between the antenna and the AFE by means of a switching operation,
   wherein the one or more switches comprises:
   a first switch and a third switch,
   a rechargeable battery for storing the voltage generated in the AFE, and
   a second switch and a fourth switch that allow the voltage stored in the rechargeable battery to be supplied to different parts of the tag to thereby control the operation of the first switch and the third switch.

2. The RFID tag as claimed in claim 1, wherein the control module turns on the first switch and the third switch to thereby connect the antenna with the AFE, so that the RF signal is sent to the AFE and the battery is charged with the voltage applied from the AFE; and
   wherein the control module converts the second switch and the fourth switch from an off-state to an on-state when the radio communication with the reader is completed, so that the first switch and the third switch is converted from the on-state to the off-state.

3. The RFID tag as claimed in claim 2, wherein the second switch and the fourth switch are converted from the off-state to the on-state according to a control signal from the control module; and
   wherein the control module converts the second switch and the fourth switch from the off-state to the on-state when the radio communication with the reader is completed, so that current flows from the rechargeable battery to the first switch and the third switch to thereby turn the first switch and the third switch off until the charging voltage of the rechargeable voltage is discharged.

4. The RFID tag as claimed in claim 3, wherein the control module receives a predetermined signal from the reader to thereby turn the second switch and the fourth switch to the on-state.

5. The RFID tag as claimed in claim 3, wherein the control module senses the completion of the radio communication with the reader and then turns the second switch and the fourth switch to the on-state.

6. The RFID tag as claimed in claim 1, wherein the first switch and the third switch comprise analog transistors.

7. The RFID tag as claimed in claim 6, wherein the first switch and the third switch comprise PMOS (P-type metal oxide semiconductor).

8. The RFID tag as claimed in claim 1, wherein a fifth switch is connected between the rechargeable battery and the AFE in order to control a discharge rate of the rechargeable battery, and wherein the fifth switch is controlled by the control module.

9. The RFID tag as claimed in claim 1, further comprising:
   an indicator connected to the rechargeable battery or the AFE in order to indicate a state of the RFID tag; and
   a sixth switch connected between the rechargeable battery and the indicator; and
   wherein the on/off state of the sixth switch is controlled by the control module.

10. An RFID tag comprising:
    an antenna receiving an RF signal from a reader;
    an AFE (analog front end) generating voltage using the RF signal;
    an indicator indicating an operation state;
    one or more switches interposed between the indicator and the AFE and controlling the connection between the indicator and the AFE through a switching operation,
    wherein the one or more switches comprises:
    a first switch and a third switch,
    a rechargeable battery for storing the voltage generated in the AFE, and
    a second switch and a fourth switch that allow the voltage stored in the rechargeable battery to be supplied to different parts of the tag to thereby control the operation of the first switch and the third switch.

11. The RFID tag as claimed in claim 10, wherein the control module receives a predetermined signal from the reader to thereby turn the one or more switches to an on-state.

12. The RFID tag as claimed in claim 10, wherein the control module senses the completion of the radio communication with the reader to thereby turn the one or more switches to the on-state.

13. The RFID tag as claimed in claim 10, wherein the control module converts the one or more switches from the off-state to the on-state to thereby operate the indicator using the voltage stored in a rechargeable battery when the radio communication with the reader is completed.

14. The RFID tag as claimed in claim 10, wherein the indicator comprises one of a speaker, a display and an electronic sensor (electronic paper).

15. The RFID tag as claimed in claim 9 or 10, wherein it further comprises a battery disposed inside or outside the RFID tag and controlling the connection between the indicator and the antenna via the on/off operation of the one or more switches.

\* \* \* \* \*